United States Patent
Anantha et al.

(10) Patent No.: US 12,165,409 B2
(45) Date of Patent: Dec. 10, 2024

(54) REDUCING FALSE NEGATIVES AND FINDING NEW CLASSES IN OBJECT DETECTORS

(71) Applicant: MOTOROLA SOLUTIONS, INC., Chicago, IL (US)

(72) Inventors: Aravind Anantha, Malden, MA (US); Jason Verelli, Coquitlam (CA); Patrick Beaulieu, Vancouver (CA); Daniel Booth, Vancouver (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 475 days.

(21) Appl. No.: 17/116,421

(22) Filed: Dec. 9, 2020

(65) Prior Publication Data
US 2022/0180102 A1    Jun. 9, 2022

(51) Int. Cl.
*G06V 20/40* (2022.01)
*G06F 16/45* (2019.01)
*G06F 18/214* (2023.01)
*G06V 20/64* (2022.01)

(52) U.S. Cl.
CPC ............. *G06V 20/41* (2022.01); *G06F 16/45* (2019.01); *G06F 18/214* (2023.01); *G06V 20/49* (2022.01); *G06V 20/64* (2022.01)

(58) Field of Classification Search
CPC ........ G06V 20/41; G06V 20/49; G06V 20/64; G06F 16/45; G06K 9/6256
See application file for complete search history.

(56) References Cited

U.S. PATENT DOCUMENTS

| | | | |
|---|---|---|---|
| 8,064,688 | B2 | 11/2011 | Schneiderman |
| 8,189,880 | B2 | 5/2012 | Wen et al. |
| 2019/0311221 | A1 | 10/2019 | Murali et al. |
| 2020/0097769 | A1* | 3/2020 | Lipchin ................ G06K 9/6267 |
| 2021/0089833 | A1 | 3/2021 | Anantha et al. |

FOREIGN PATENT DOCUMENTS

JP    2018534694 A    11/2018

OTHER PUBLICATIONS

Farasin, Alessandro, et al. "Real-time object detection and tracking in mixed reality using microsoft hololens." 15th International Joint Conference on Computer Vision, Imaging and Computer Graphics Theory and Applications, VISIGRAPP 2020. vol. 4. SciTePress, 2020. (Year: 2020).*

(Continued)

*Primary Examiner* — Amandeep Saini
*Assistant Examiner* — Denise G Alfonso (57) ABSTRACT

Reducing false negatives and finding new classes in object detectors is disclosed. Also disclosed is a method that includes grouping together a plurality of cropped image portions from region proposals based on image properties. The method also includes receiving first user input that either establishes that the grouped together, cropped image portions relate to uninteresting objects or establishes that the grouped together, cropped image portions relate to an object class of interesting objects. The method also includes obtaining, only when the grouped together, cropped image portions relate to the object class of interesting objects, second user input that includes an object label corresponding to the object class of interesting objects.

20 Claims, 5 Drawing Sheets

(56) References Cited

OTHER PUBLICATIONS

Papadopoulos, Dim P., et al. "We don't need no bounding-boxes: Training object class detectors using only human verification." Proceedings of the IEEE conference on computer vision and pattern recognition. 2016. (Year: 2016).*

Pelleg, Dan, and Andrew Moore. "Active learning for anomaly and rare-category detection." Advances in neural information processing systems 17 (2004). (Year: 2004).*

Farasin Alessandro et al: "Real-time Object Detection and Tracking in Mixed Reality using Microsoft HoloLens", Proceedings of the 15th International Joint Conference On Computer Vision Imaging and Computer Graphics Theory and Applications, [Online] Feb. 29, 2020 (Feb. 29, 2020), pp. 165-172, XP055892576, DOI: 10.5220/0008877901650172 ISBN: 978-989-7584-02-2.

Stephan Gammeter et al: "Server-side object recognition and client-side object tracking for mobile augmented reality", Computer Vision and Pattern Recognition Workshops (CVPRW), 2010 IEEE Computer Society Conference ON, IEEE, Piscataway, NJ, USA, Jun. 13, 2010 (Jun. 13, 2010), pp. 1-8, XP031728435, ISBN: 978-1-4244-7029-7 Section 2; Section 3; Section 4, all pages.

Bahri Haythem et al: "Accurate Object Detection System on HoloLens Using YOLO Algorithm", 2019 International Conference On Control, Artificial Intelligence, Robotics & Optimization (ICCAIRO), IEEE, May 3, 2019 (May 5, 2019), pp. 219-224, XP033753924, DOI: 10.1109/ICCAIRO47923.2019.00042 [retrieved on May 3, 2020] Section III, all pages.

Papadopoulos Dim p et al: "We Don't Need No Bounding-Boxes: Training Object Class Detectors Using Only Human Verification", 2016 IEEE Conference On Computer Vision and Pattern Recognition (CVPR), IEEE, Jun. 27, 2016 (Jun. 27, 2016), pp. 854-863, XP033021216, DOI: 10.1109/CVPR.2016.99 [retrieved on Dec. 9, 2016] Section 3; Section 4, all pages.

The International Search Report and the Written Opinion corresponding patent application No. PCT/US2021/061391 filed Dec. 1, 2021, mailed Mar. 2, 2022, all pages.

Lin Wang, Kuk-Jin Yoon, "Knowledge Distillation and Student-Teacher Learning for Visual Intelligence: A Review and New Outlooks", [Submitted on Apr. 13, 2020 (v1), last revised Oct. 11, 2020 (this version, v4)], ARxIV Preprint ARxIV:2004.05937 (2020), all pages.

Yan, Xueting, Ishan Misra, Abhinav Gupta, Deepti Ghadiyaram, and Dhruv Mahajan. "ClusterFit: Improving Generalization of Visual Representations." In Proceedings of the IEEE/CVF Conference on Computer Vision and Pattern Recognition, pp. 6509-6518. 2020.

* cited by examiner

REDUCING FALSE NEGATIVES AND FINDING NEW CLASSES IN OBJECT DETECTORS

BACKGROUND

Computer-implemented visual object detection, also called object recognition, pertains to locating and classifying visual representations of real-life objects found in still images or motion videos captured by a camera. By performing visual object detection, each visual object found in the still images or motion video is classified according to its type (such as, for example, human, vehicle, or animal).

Automated security systems typically employ video cameras, other image capturing devices or sensors to collect image data such as video. Images represented by the image data may be displayed for contemporaneous screening by security personnel and/or recorded for later review after a security breach. Computer-implemented visual object detection can greatly assist security personnel and others in connection with these sorts of activities.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a method that includes receiving video at a first object detector that generates first output data. A portion of the first output data includes identification of any objects of interests within the video. The method also includes analyzing the first output data to make a determination that each of a plurality of factors indicate a potential missed object detection within the video. The method also includes sending the video from a system site to a cloud server based on the determination, the cloud server including a second object detector having more computational resources than the first object detector. The method also includes inputting the video to the second object detector to generate second output data therefrom. A portion of the second output data identifying a potential interesting object corresponding to the potential missed object detection. The method also includes receiving first user input that either establishes that the potential interesting object is an uninteresting object or establishes that the potential interesting object is a confirmed interesting object. The method also includes obtaining, only when the potential interesting object is a confirmed interesting object, second user input that includes an object label corresponding to the confirmed interesting object.

In accordance with another example embodiment, there is provided a system that includes a cloud server and a system site in communication with the cloud server. The system site includes a first object detector configured to receive video and generate first output data therefrom. A portion of the first output data includes identification of any objects of interests within the video. The system site is configured to analyze the first output data to make a determination that each of a plurality of factors indicate a potential missed object detection within the video. The system site is also configured to send the video to the cloud server based on the determination. The cloud server includes a second object detector having more computational resources than the first object detector, and the second object detector is configured to receive the video to generate second output data therefrom. A portion of the second output data identifies a potential interesting object corresponding to the potential missed object detection. The system also includes a client device that is configured to receive first user input that either establishes that the potential interesting object is an uninteresting object or establishes that the potential interesting object is a confirmed interesting object. The client device is also configured to obtain, only when the potential interesting object is a confirmed interesting object, second user input that includes an object label corresponding to the confirmed interesting object.

In accordance with yet another example embodiment, there is provided a method that includes grouping together a plurality of cropped image portions from region proposals based on image properties. The method also includes receiving first user input that either establishes that the grouped together, cropped image portions relate to uninteresting objects or establishes that the grouped together, cropped image portions relate to an object class of interesting objects. The method also includes obtaining, only when the grouped together, cropped image portions relate to the object class of interesting objects, second user input that includes an object label corresponding to the object class of interesting objects.

Each of the above-mentioned embodiments will be discussed in more detail below, starting with example system and device architectures of the system in which the embodiments may be practiced, followed by an illustration of processing blocks for achieving an improved technical method, device, and system for reducing false negatives and finding new classes in object detectors.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

As understood by those skilled in the art, a plurality of sequential image frames may together form a video captured by some video capture device. Each image frame may be represented by a matrix of pixels, each pixel having a pixel image value. For example, the pixel image value may be a numerical value on grayscale (such as, for example, 0 to 255) or a plurality of numerical values for colored images. Examples of color spaces used to represent pixel image values in image data include RGB, YUV, CYKM, YCBCR 4:2:2, YCBCR 4:2:0 images.

Processing video may include, but is not limited to, image processing operations, analyzing, managing, compressing, encoding, storing, transmitting and/or playing back the video data. Analyzing the video may include segmenting areas of image frames and detecting visual objects, and/or tracking and/or classifying visual objects located within the captured scene represented by the image data. The processing of the image data may also cause additional information regarding the image data or visual objects captured within the images to be output. For example, such additional information is commonly understood as metadata. The metadata may also be used for further processing of the image data, such as drawing bounding boxes around detected objects in the image frames. "Metadata" or variants thereof herein refers to information obtained by computer-implemented analysis of images including images in video.

The term "object" as used herein is understood to have the same meaning as would normally be given by one skilled in the art of video analytics, and examples of objects may include humans, vehicles, animals, other entities, etc.

Further advantages and features consistent with this disclosure will be set forth in the following detailed description, with reference to the figures.

Figure 1:
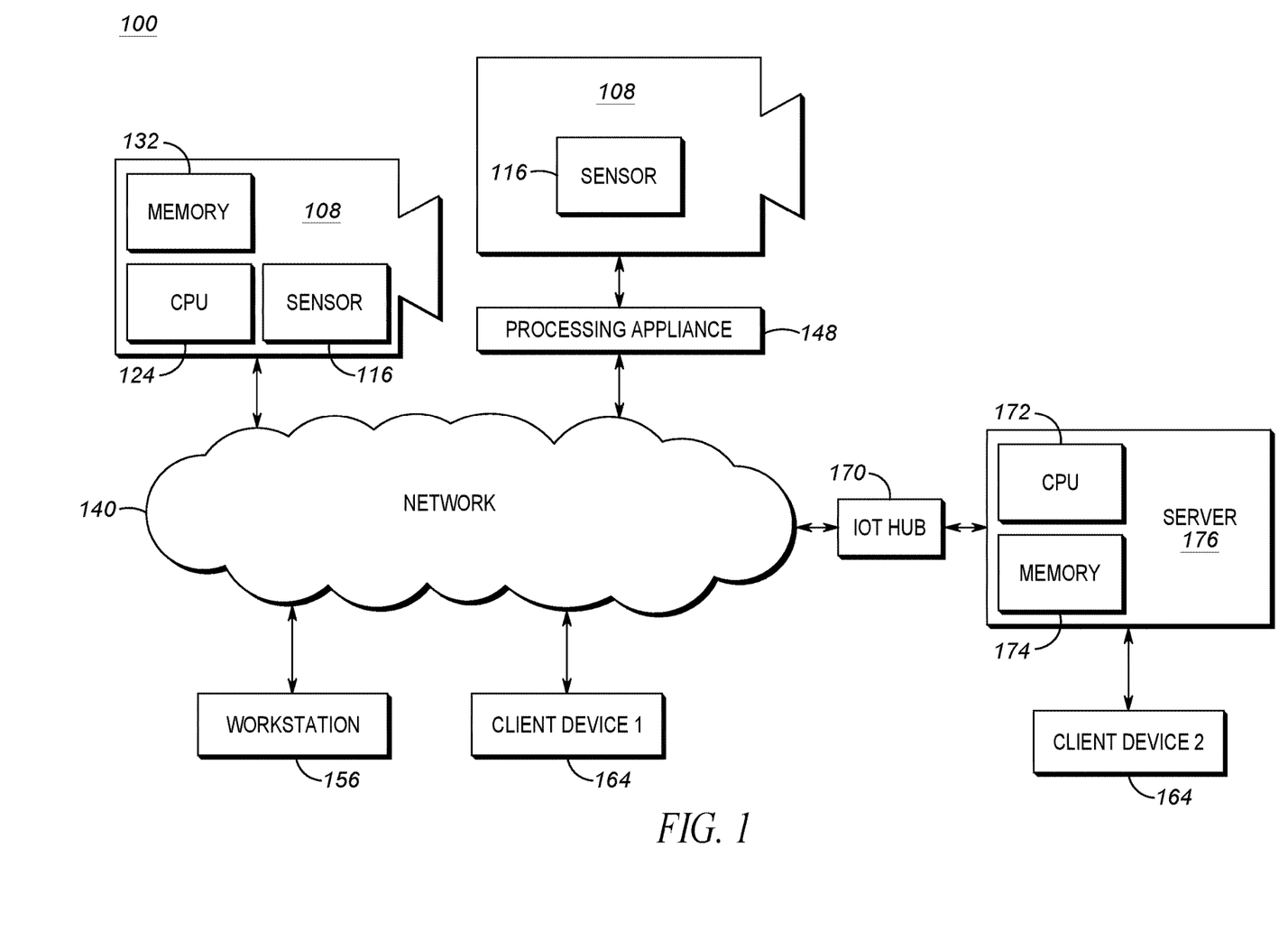
FIG. 1 is a block diagram of connected devices of a video capture and playback system according to an example embodiment.

Referring now to the drawings, and in particular FIG. 1, therein illustrated is a block diagram of connected devices of a video capture and playback system 100 according to an example embodiment. For example, the video capture and playback system 100 may be installed and configured to operate as a video security system. The video capture and playback system 100 includes hardware and software that perform the processes and functions described herein.

The video capture and playback system 100 includes a video capture device 108 being operable to capture a plurality of images and produce image data representing the plurality of captured images. The video capture device 108 or camera 108 is an image capturing device and includes security video cameras.

Each video capture device 108 includes an image sensor 116 for capturing a plurality of images. The video capture device 108 may be a digital video camera and the image sensor 116 may output captured light as a digital data. For example, the image sensor 116 may be a CMOS, NMOS, or CCD. In some embodiments, the video capture device 108 may be an analog camera connected to an encoder.

The image sensor 116 may be operable to capture light in one or more frequency ranges. For example, the image sensor 116 may be operable to capture light in a range that substantially corresponds to the visible light frequency range. In other examples, the image sensor 116 may be operable to capture light outside the visible light range, such as in the infrared and/or ultraviolet range. In other examples, the video capture device 108 may be a multi-sensor camera that includes two or more sensors that are operable to capture light in same or different frequency ranges.

The video capture device 108 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another video capture device 108. For example, the dedicated camera may be a security camera, such as any one of a pan-tilt-zoom camera, dome camera, in-ceiling camera, box camera, and bullet camera.

Additionally, or alternatively, the video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes a processor 124, a memory device 132 coupled to the processor 124 and a network interface. The memory device can include a local memory (such as, for example, a random access memory and a cache memory) employed during execution of program instructions. The processor executes computer program instructions (such as, for example, an operating system and/or application programs), which can be stored in the memory device.

In various embodiments the processor 124 may be implemented by any suitable processing circuit having one or more circuit units, including a digital signal processor (DSP), graphics processing unit (GPU) embedded processor, a visual processing unit or a vision processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the video capture device 108 may be implemented together within a system on a chip (SOC). For example, the processor 124, the memory device 116 and the network interface may be implemented within a SOC. Furthermore, when implemented in this way, a general purpose processor and one or more of a GPU or VPU, and a DSP may be implemented together within the SOC.

Continuing with FIG. 1, each of the video capture devices 108 is connected to a network 140. Each video capture device 108 is operable to output image data representing images that it captures and transmit the image data over the network.

It will be understood that the network 140 may be any suitable communications network that provides reception and transmission of data. For example, the network 140 may be a local area network, external network (such as, for example, a WAN, or the Internet) or a combination thereof. In other examples, the network 140 may include a cloud network.

In some examples, the video capture and playback system 100 includes a processing appliance 148. The processing appliance 148 is operable to process the image data output by a video capture device 108. The processing appliance 148 also includes one or more processors and one or more memory devices coupled to a processor (CPU). The processing appliance 148 may also include one or more network interfaces. For convenience of illustration, only one processing appliance 148 is shown; however it will be understood that the video capture and playback system 100 may include any suitable number of processing appliances 148.

For example, and as illustrated, the processing appliance 148 is connected to a video capture device 108 which may not have memory 132 or CPU 124 to process image data. The processing appliance 148 may be further connected to the network 140.

According to one example embodiment, and as illustrated in FIG. 1, the video capture and playback system 100 includes a workstation 156, each having one or more processors including graphics processing units (GPUs). The workstation 156 may also include storage memory. The workstation 156 receives image data from at least one video capture device 108 and performs processing of the image data. The workstation 156 may further send commands for managing and/or controlling one or more of the video capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data. The received metadata may include, inter alia, object detection and classification information.

It will be understood that while a single workstation 156 is illustrated in FIG. 1, the workstation may be implemented as an aggregation of a plurality of workstations.

FIG. 1 also depicts a server 176 that is communicative with the cameras 108, processing appliance 148, and workstation 156 via the network 140 and an Internet-of-things hub 170 ("IOT hub"). The server 176 may be an on-premises server or it may be hosted off-site (such as, for example, a public cloud). The server 176 comprises one or more processors 172, one or more memory devices 174 coupled to the one or more processors 172, and one or more network interfaces. As with the cameras 108, the memory device 174 can include a local memory (such as, for example, a random access memory and a cache memory) employed during execution of program instructions. The processor 172 executes computer program instructions (such as, for example, an operating system and/or application programs), which can be stored in the memory device 174. In at least some example embodiments, circuitry or other implementations of the processor 124 and memory device 132 of the cameras 108 may also be used for the processor 172 and memory device 174 of the server 176. In at least some example embodiments, the IOT hub 170 is a cloud-hosted, managed service that bi-directionally connects the server 176 to the rest of the network 140 and the devices connected to it, such as the camera 108. The IOT hub 170 may, for example, comprise part of the Microsoft™ Azure™ cloud computing platform, and the server 176 may accordingly be cloud-hosted using the Microsoft™ Azure™ platform. Different example embodiments are possible. For example, the IOT hub 170 may be replaced with one or more of an Ethernet hub, router, and switch (managed or unmanaged), regardless of whether the server 176 is cloud-hosted. The server 176 may additionally or alternatively be directly connected to any one or more of the other devices of the system 100. Further, while use of the IOT hub 170 implies that the server 176 is networked to a large number of Internet-connected computing appliances, this may be the case in certain embodiments and not in others. For example, the system 100 may comprise a very large number of the cameras 108; alternatively, the system 100 may comprise only a handful of cameras 108 and other network-connected devices or appliances, and the IOT hub 170 may nonetheless still be used.

Any one or more of the cameras 108, processing appliance 148, and workstation 156 may act as edge devices that communicate with the server 176 via the network 140 and IOT hub 174. Any of the edge devices may, for example, perform initial processing on captured video and subsequently send some or all of that initially processed video to the server 176 for additional processing. For example, the camera 108 may apply a first type of video analytics to analyze video captured using the camera 108 to detect an object or identify an event and to then generate a video clip of a certain duration that includes that object or event. The camera 108 may then send the video clip and metadata describing that object or event to the server 176 for more robust processing using a second type of video analytics that requires more computational resources than the first type of video analytics and that is accordingly unsuitable for deployment on the camera 108.

The video capture and playback system 100 further includes a pair of client devices 164 connected to the network 140. In FIG. 1, a first client device 164 is connected to the network 140, and a second client device 164 is connected to the server 176. The client device 164 is used by one or more users to interact with the video capture and playback system 100. Accordingly, the client device 164 includes a display device and a user input device (such as, for example, a mouse, keyboard, or touchscreen). The client device 164 is operable to display on its display device a user interface for displaying information, receiving user input, and playing back video. For example, the client device may be any one of a personal computer, laptop, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation 156 and one or more client devices 164.

In some examples, the image capture and playback system 100 may be implemented without the workstation 156 and/or the server 176. Accordingly, image processing functionalities may be wholly performed on the one or more video capture devices 108. Alternatively, the image processing functionalities may be shared amongst two or more of the video capture devices 108, processing appliance 148 and client devices 164.

Figure 2A:
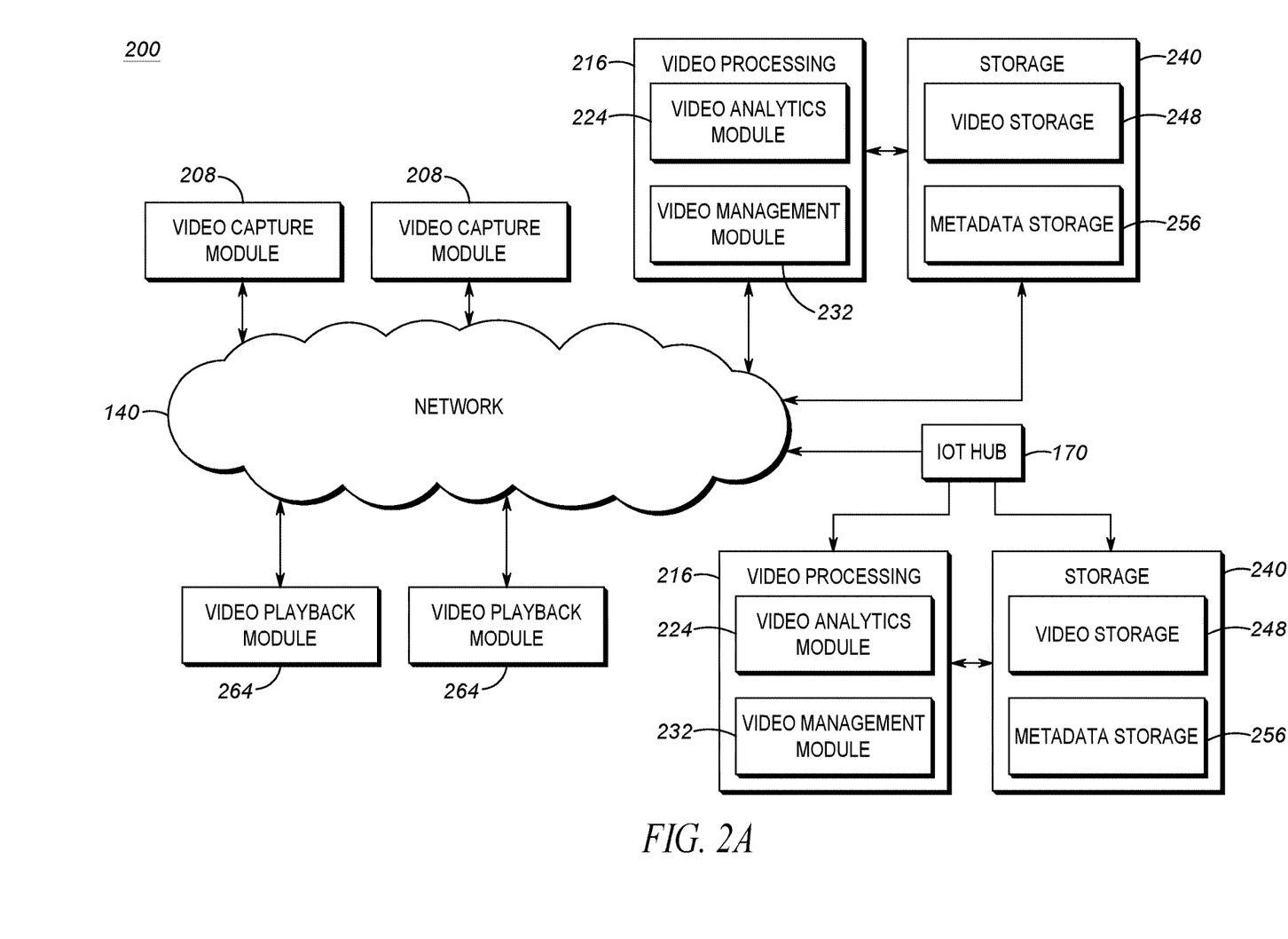
FIG. 2A is a block diagram of a set of operational modules of the video capture and playback system according to an example embodiment.

Referring now to FIG. 2A, therein illustrated is a block diagram of a set 200 of operational modules of the video capture and playback system 100 according to one example embodiment. The operational modules may be implemented in hardware, software or both on one or more of the devices of the video capture and playback system 100 as illustrated in FIG. 1.

The set 200 of operational modules includes video capture modules 208 (two shown for purposes of illustration; however any suitable number is contemplated). For example, each video capture device 108 may implement a video capture module 208. The video capture module 208 is operable to control one or more components (such as, for example, sensor 116) of a video capture device 108 to capture images.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 may further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, identifying objects "left behind" or "removed", unusual motion, and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video capture and playback system 100 for storing image data.

It will be understood that according to some example embodiments, the subset 216 of video processing modules may include only one of the video analytics module 224 and the video management module 232.

The set 200 of operational modules further include a subset 240 of storage modules. For example, and as illustrated, the subset 240 of storage modules include a video storage module 248 and a metadata storage module 256. The video storage module 248 stores image data, which may be image data processed by the video management module. The metadata storage module 256 stores information data output from the video analytics module 224. Also, it is contemplated that training data (described in more detail later herein) may be stored. More specifically, image and/or video portions of the training data may be stored in the video storage module 248, and metadata portions of the training data may be stored in the metadata storage module 256.

It will be understood that while video storage module 248 and metadata storage module 256 are illustrated as separate modules, they may be implemented within a same hardware storage whereby logical rules are implemented to separate stored video from stored metadata. In other example embodiments, the video storage module 248 and/or the metadata storage module 256 may be implemented using hardware storage using a distributed storage scheme.

The set of operational modules further includes video playback modules 264 (two shown for purposes of illustration; however any suitable number is contemplated), which are operable to receive image data and playback the image data as a video. For example, the video playback module 264 may be implemented on a client device 164.

The operational modules of the set 200 may be implemented on one or more of the video capture device 108, processing appliance 148, workstation 156, server 176, and client device 164. In some example embodiments, an operational module may be wholly implemented on a single device. For example, the video analytics module 224 may be wholly implemented on the workstation 156. Similarly, the video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between two or more of the video capture device 108, processing appliance 148, server 176, and workstation 156. Similarly, video management functionalities may be split between two or more of an video capture device 108, processing appliance 148, server 176, and workstation 156.

Figure 2B:
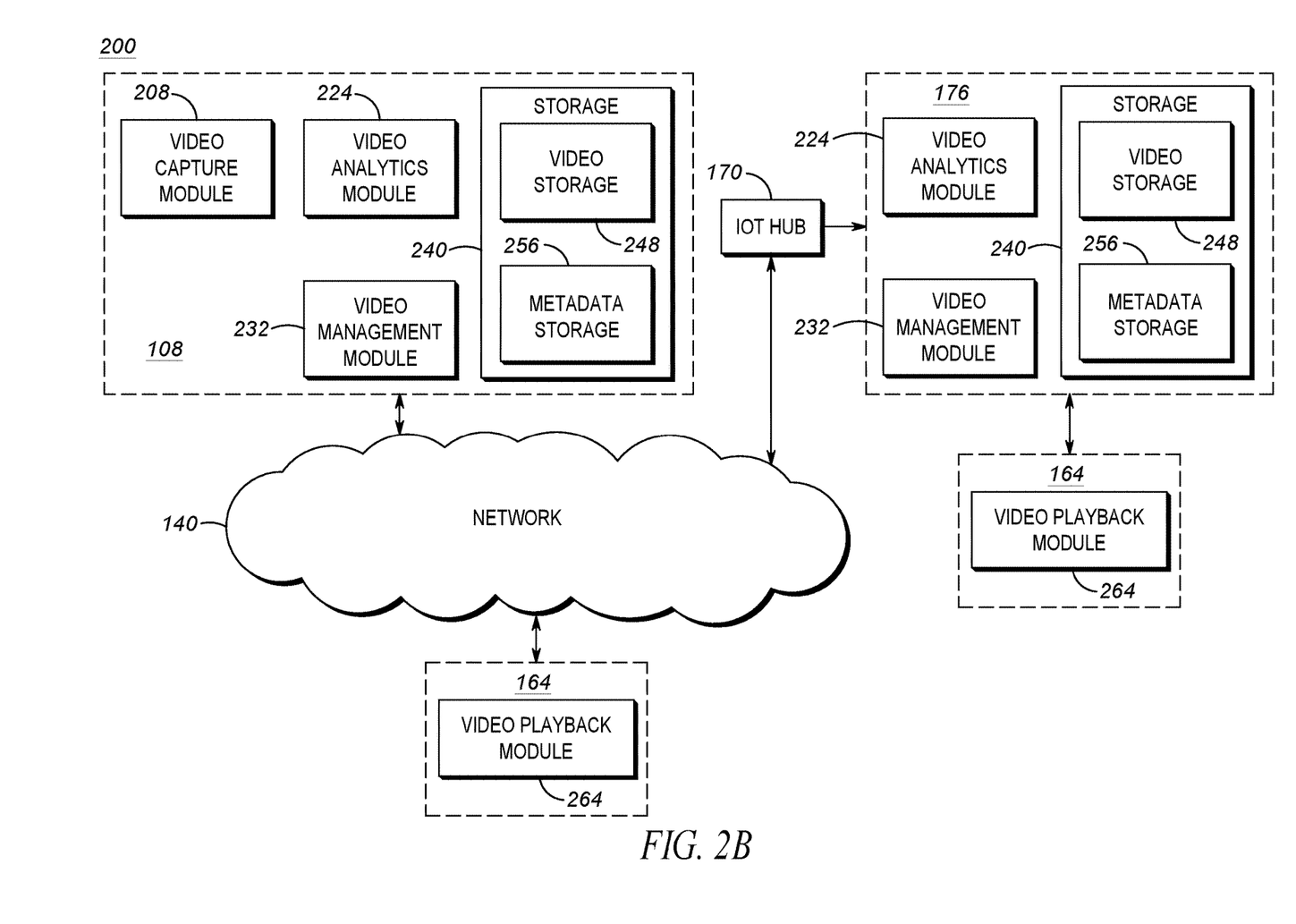
FIG. 2B is a block diagram of a set of operational modules of the video capture and playback system according to one particular example embodiment in which a video analytics module, a video management module, and storage are wholly implemented on each of a video capture device and a server.

Referring now to FIG. 2B, therein illustrated is a block diagram of a set 200 of operational modules of the video capture and playback system 100 according to one particular example embodiment in which the video analytics module 224, the video management module 232, and the storage 240 is wholly implemented on each of the camera 108 and the server 176. The video analytics module 224, the video management module 232, and the storage 240 may additionally or alternatively be wholly or partially implemented on one or more processing appliances 148. The video playback module 264 is implemented on each of the client devices 164, thereby facilitating playback from either device. As mentioned above in respect of FIG. 1, the video analytics implemented on the camera 108 and on the server 176 may complement each other. For example, the camera's 108 video analytics module 224 may perform a first type of video analytics, and send the analyzed video or a portion thereof to the server 176 for additional processing by a second type of video analytics using the server's 176 video analytics module 224.

It will be appreciated that allowing the subset 216 of image data (video) processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (such as, for example, manufacturers) or retrofitting an existing video capture and playback system.

Typically, limited processing power is available on board the camera 108. The object detections generated by the camera's 108 video analytics module 224 accordingly are subject to, in at least some example embodiments, errors in the form of a material number of false positives (i.e., detecting an object when no object is present) and/or false negatives (i.e., failing to detect an object when the object is present). In order to mitigate these errors, the object detections that the camera's 108 video analytics module 224 outputs may be further processed by a decision tree implemented, for example, on the server 176, client device 164, processing appliance 148, and/or workstation 156. The decision tree filters out at least some false positives and negatives and acts as another filter that the system 100 uses to process camera detections prior to displaying them to a user.

For practical applications, the decision tree is trained prior to being relied upon. The decision tree may be trained manually. For example, a user may manually mark a certain number of example detections generated by the camera 108 as being accurate (a "positive example") or as being inaccurate (a "negative example"), and then use the positive and negative examples to train the decision tree. Training a decision tree may comprise, for example, one or both of induction and pruning of the decision tree. The user may, for example, mark thirty positive examples and thirty negative examples. However, manually marking detections is tedious for the user, inefficient, and is a disincentive to using the decision tree.

In at least some example embodiments herein, positive and negative examples are generated automatically and can be used to train the decision tree, thereby increasing system efficiency relative to a system in which the decision tree is manually trained. More particularly, in at least some example embodiments a first object detector runs on the camera 108 and a second object detector runs on a device with more computational resources (i.e. a greater available amount of computational resources) than the camera 108, such as the server 176. By virtue of having access to greater computational resources, the second object detector is able to, on average, generate more accurate detections than the first object detector.

Positive and negative training data generated according to example embodiments herein may be used to train any suitable supervised machine learning process that may use such examples for training. For instance, in addition to being used to train a decision tree, the examples may be used to train support vector machines, linear regression, and logistic regression processes.

Figure 3:
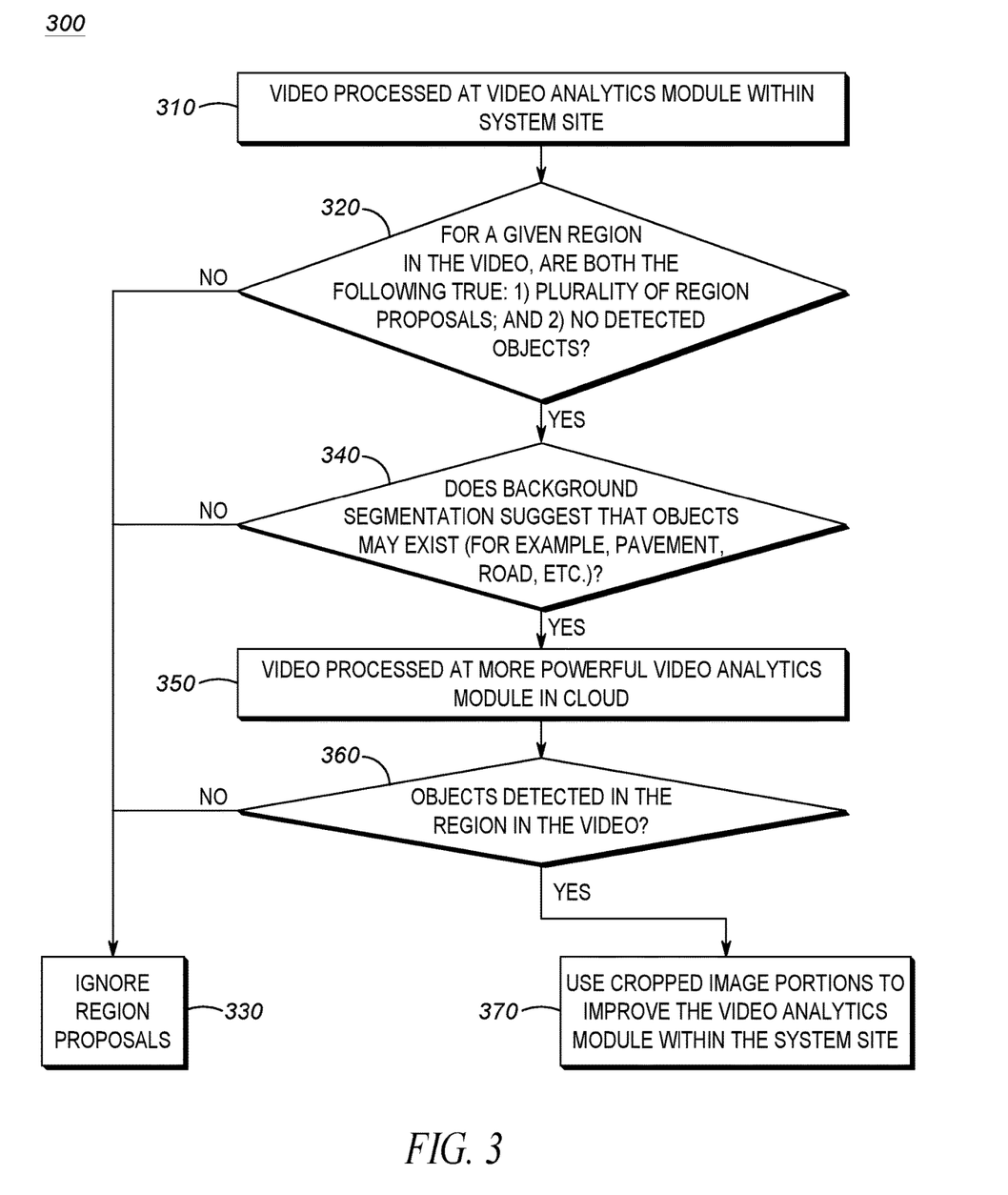
FIG. 3 is a flow chart illustrating a method for taking corrective action for missed classification of objects in accordance with an example embodiment.

Reference is now made to FIG. 3. FIG. 3 is a flow chart illustrating a method 300 for taking corrective action for missed classification of objects in accordance with an example embodiment.

First in the method 300, video is processed (310) at a video analytics module within the system site. For example, the video may be processed at the video analytics module 224 that: i) runs a first neural network model; and ii) resides within a server (for instance, residing in a workstation, residing in an appliance, etc.) local to the system site with respect to which also reside the camera 108 that captured the video.

Next is decision action (320) where it is determined (for example, by the server local to the system site) whether, for a given region in the video, both of the following are applicable: 1) a plurality of region proposals exist; and 2) there are no detected objects. Regarding 2), those skilled in the art will appreciate that whether an object is detected or not is not necessarily one of either absolutely detected or absolutely not detected, but detection may instead be evaluated based on some confidence value between 0% and 100%, such that when the percentage confidence is below some defined threshold, the result is marked as a non-detection (for example, such a result may be treated as noise).

Still with reference to the decision action 320, if the determination is "NO", then action 330 follows and the region proposals are ignored. Alternatively, if the determination is "YES", then decision action 340 follows.

For the decision action 340, a determination is made (for example, by the server local to the system site) as to whether or not background segmentation suggests that objects may exist (such as, for example, a road, pavement, etcetera). If "NO", then the action 330 follows and the region proposals are ignored. If "YES", then the video is processed (350) at a more powerful video analytics module in the cloud. For example, with reference to FIG. 2B, the video is sent out from the system site to the remote server 176 via the IOT hub 170. Residing within the remote server 176 is the video analytics module 224 which may include a second neural network model which is bigger than the aforementioned first neural network model (i.e. "bigger" in the sense that the model is more expanded and/or is supported by more computational resources).

With reference once again to FIG. 3, decision action 360 follows the action 350. At the decision action 360, a determination is made (for example, within the remote/cloud server 176) as to whether or not the more powerful video analytics module outputted any object detections in the region in the video? If "NO", then the action 330 follows and the region proposals are ignored. If "YES", then cropped image portions are used (370) to improve the video analytics module within the system site. For example, the first neural network model of the video analytics module 224 within the server local to the system site is improved.

Figure 4:
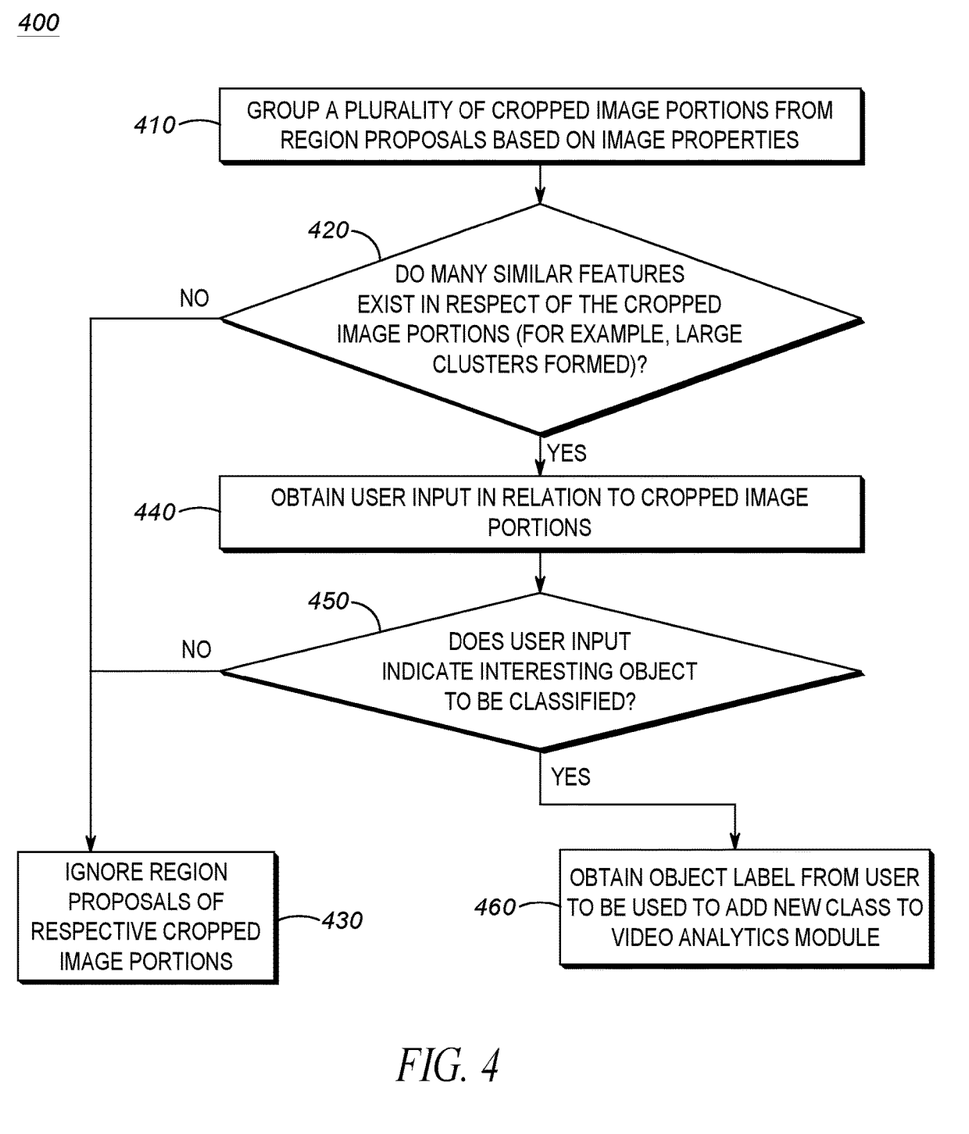
FIG. 4 is a flow chart illustrating a method for processing user input in carrying out one or more new object classifications in accordance with an example embodiment.

Reference is now made to FIG. 4. FIG. 4 is a flow chart illustrating a method 400 for processing user input in carrying out one or more new object classifications in accordance with an example embodiment. In some examples, the method 400 is carried out when there is some degree of failure or insufficiency of performance in classification by the video analytics module 224 in the cloud server 176 (FIG. 2B). In other examples, the method 400 may be carried out independent of whatever is happening (or not happening) within a cloud/remote server.

First in the method 400, a plurality of cropped image portions are grouped (410) from region proposals based on image properties. This may include, for instance, applying a grouping algorithm (such as, for example, employing a light-weight feature extractor) which may be suitably implemented by those skilled in the art without inventive experimentation. In some examples, this grouping and subsequent decision action 420 (discussed below) is carried out by a server local to the system site. In other alternative examples, this grouping and the subsequent decision action 420 is carried out by the remote/cloud server 176.

Next is the decision action 420, where it is determined whether or not many similar features exist in respect of the cropped image portions (such as, for example, whether or not there are large clusters that are formed). If "NO", then region proposals of the respective cropped image portions are ignored (430). If "YES", then user input is obtained (440) in relation to the cropped image portions. For instance, an input device (such as one or more of, for example, a keyboard, mouse, etcetera) attached to the client device 164 or the workstation 156 (FIG. 1) may be operated by the user to provide the user input.

Decision action 450 follows the action 440. For this decision action, a determination is made as to whether or not the user input obtained at the action 440 indicates an interesting object to be classified. For example, one of a plurality of different actions will be taken depending upon whether the input provided through a user interface was a selection of "yes, the object is interesting" or the alternative selection of "no, the object is not interesting" (for instance, birds [whether considered generally or considered in terms of specific types] may be un-interesting). If the "NO" branch of the decision action 450 applies, then the region proposals of the respective cropped image portions are ignored (430).

If instead of the "NO" branch it is the "YES" branch of the decision action 450 that applies, then an object label is obtained (460) from the user to add a new class to the video analytics module. (As an alternative to the illustrated action 460, a case where the class does exist but was missed by the video analytics is contemplated as well. For such a case, the alternative action may be to add a marking rather than adding a new class.) More specifically in regards to the action 460, an input device (such as one or more of, for example, a keyboard, mouse, etcetera) attached to the client device 164 or the workstation 156 (FIG. 1) may be operated by the user to provide object label input through a user interface. In this manner, the object label input may be employed (for example, applied to all appropriate training data that has been stored in the storage 240, for instance) to modify the appropriate model within the system 100. For example, a model employed within the video analytics module 224 may be modified based on the object label input such that the difficult to detect/classify object becomes more easily detectable and classifiable. Regarding training data that has been captured by edge devices (for example, one or more of the cameras 108), it is contemplated that in some examples this training data may be shared across different system sites and/or customers; however privacy considerations may apply such as, for example, redacting portions or all of certain objects, certain words appearing in the background, etc.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etcetera, and cannot implement computer vision algorithms and functions, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains ... a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving video at a first object detector that generates first output data, a portion of the first output data including identification of one or more objects of interest within the video;
analyzing the first output data to make a determination that each of a plurality of factors indicate a potential missed object detection within the video;
sending the video from a system site to a cloud server based on the determination, the cloud server including a second object detector having more computational resources than the first object detector;
inputting the video to the second object detector to generate second output data therefrom, a portion of the second output data identifying a potential interesting object corresponding to the potential missed object detection, and the potential interesting object being more difficult to classify into a respective object class than any of the one or more objects of interest previously identified by the first object detector;
receiving first user input needed for establishing that either the potential interesting object is an uninteresting object or confirms that the potential interesting object is an interesting object; and only when the potential interesting object is a confirmed interesting object, obtaining second user input that includes an object label corresponding to the confirmed interesting object.

2. The method of claim 1 wherein the factors include existence of a plurality of region proposals, lack of a detected object and background segmentation data.

3. The method of claim 1 wherein each of the first and second object detectors includes at least one convolutional neural network.

4. The method of claim 1 further comprising modifying the second object detector to reflect the object label.

5. The method of claim 1 further comprising modifying the first object detector to reflect the object label.

6. The method of claim 1 further comprising capturing the video at a security video camera, the capturing occurring prior to the receiving of the video at the first object detector.

7. The method of claim 1 wherein the object label is a new object label.

8. A system comprising:
a cloud server;
a system site in communication with the cloud server and including a first object detector configured to receive video and generate first output data therefrom, wherein a portion of the first output data includes identification of one or more objects of interest within the video, and the system site being configured to:
analyze the first output data to make a determination that each of a plurality of factors indicate a potential missed object detection within the video; and
sending the video to the cloud server based on the determination, and
the cloud server including a second object detector having more computational resources than the first object detector, and the second object detector configured to receive the video to generate second output data therefrom, a portion of the second output data identifying a potential interesting object corresponding to the potential missed object detection, and the potential interesting object being more difficult to classify into a respective object class than any of the one or more objects of interest previously identified by the first object detector; and
a client device configured to:
receiving first user input needed for establishing that either the potential interesting object is an uninteresting object or confirms that the potential interesting object is an interesting object; and
only when the potential interesting object is a confirmed interesting object, obtaining second user input that includes an object label corresponding to the confirmed interesting object.

9. The system of claim 8 wherein the factors include existence of a plurality of region proposals, lack of a detected object and background segmentation data.

10. The system of claim 8 wherein each of the first and second object detectors includes at least one convolutional neural network.

11. The system of claim 8 wherein the cloud server is configured to modify the second object detector to reflect the object label.

12. The system of claim 8 the system site is further configured to modify the first object detector to reflect the object label.

13. The system of claim 8 wherein the system site further includes at least one security video camera configured to capture the video prior to the video being received at the first object detector.

14. The system of claim 8 wherein the object label is a new object label.

15. A computer-implemented method comprising:
grouping together, by employing at least one processor, a plurality of cropped image portions from region proposals based on image properties;
employing the at least one processor to determine, based on feature similarity in respect of the cropped image portions, that rather than ignoring the region proposals, instead at least first user input should be obtained;
after a determination that the first user input should be obtained, receiving the first user input that either establishes that the grouped together, cropped image portions relate to uninteresting objects or establishes that the grouped together, cropped image portions relate to an object class of interesting objects; and
only when the grouped together, cropped image portions relate to the object class of interesting objects, obtaining second user input that includes an object label corresponding to the object class of interesting objects.

16. The computer-implemented method of claim 15 wherein the grouping together of the cropped image portions is carried out within a system site that includes at least one client device.

17. The computer-implemented method of claim 16 wherein the client device carries out the receiving of the first user input and the obtaining of the second user input.

18. The computer-implemented method of claim 17 wherein the client device is a mobile device.

19. The computer-implemented method of claim 15 wherein the object class is a new object class.

20. The computer-implemented method of claim 15 wherein the grouping together of the cropped image portions is carried out within a cloud server.

* * * * *